(12) United States Patent
Desai et al.

(10) Patent No.: US 8,600,999 B2
(45) Date of Patent: Dec. 3, 2013

(54) SYSTEM AND METHOD FOR EFFICIENT RESOURCE MANAGEMENT

(75) Inventors: Samir Desai, Maharashtra (IN); Kedar Patwardhan, Maharashtra (IN)

(73) Assignee: Symantec Corporation, Mountain View, CA (US)

( * ) Notice: Subject to any disclaimer, the term of this patent is extended or adjusted under 35 U.S.C. 154(b) by 121 days.

(21) Appl. No.: 12/781,207

(22) Filed: May 17, 2010

(65) Prior Publication Data

US 2011/0282917 A1      Nov. 17, 2011

(51) Int. Cl.
*G06F 17/00*  (2006.01)

(52) U.S. Cl.
USPC ............................ 707/745; 707/803; 707/822

(58) Field of Classification Search
None
See application file for complete search history.

(56) References Cited

U.S. PATENT DOCUMENTS

| | | | |
|---|---|---|---|
| 6,782,389 B1* | 8/2004 | Chrin et al. | 1/1 |
| 6,938,039 B1* | 8/2005 | Bober et al. | 707/704 |
| 7,802,131 B2* | 9/2010 | Watanabe et al. | 714/6.11 |
| 2002/0112022 A1* | 8/2002 | Kazar et al. | 709/217 |

* cited by examiner

*Primary Examiner* — Paul Kim
(74) *Attorney, Agent, or Firm* — Wilmer Cutler Pickering Hale and Dorr LLP

(57) ABSTRACT

Embodiments of the present invention are directed to a method and system for managing resources. The method includes receiving a request, within an electronic system, which corresponds to an object of a file system and accessing a local data structure. The data structure comprises information corresponding to a plurality of inode numbers. The method further includes performing the request and updating the local data structure based on the request. The updating of the local data structure is independent of a plurality of data structures of a cluster of servers.

21 Claims, 8 Drawing Sheets

SYSTEM AND METHOD FOR EFFICIENT RESOURCE MANAGEMENT

FIELD OF THE INVENTION

Embodiments of the present invention are generally related to digital computer systems and digital storage.

BACKGROUND OF THE INVENTION

As technology advances, data storage is increasingly important and data storage capacities are increasing rapidly. Correspondingly, the size of data storage arrays and their demands for storage have increased rapidly. Ever increasing amounts of data are required to be highly available and protected from corruption or damage that may be caused by any of a variety of factors, such as natural disasters and power failures, etc. As a result, increasingly complex data storage clusters are used to satisfy the demands for data storage and retrieval.

One conventional setup is to have a cluster of object based servers that handle requests from clients. As requests are received from the clients, the servers of the cluster access object based information to perform the requests from the clients. Each object may be assigned and tracked by an inode number and there are a specific set of inode numbers available for objects. As each inode number is allocated or deallocated, the other servers in the cluster need to be updated so that the tracking of inode numbers is synchronized throughout the cluster. This synchronization is done to ensure that when an inode number is allocated by one metadata server the other metadata servers cannot allocate the same inode number. Thus, the allocation information has to be shared by each metadata server and needs to be synchronized upon each update. The updating of object information can require a cluster wide lock of object information each time object information is updated. This synchronization thus requires significant amount of communication among the servers of the cluster. The communication requirements of synchronizing each of the servers in the cluster thereby both impacts and limits the performance of the metadata servers.

Thus, a need exists to maintain object based information without requiring communication among the servers each time object information is updated.

SUMMARY OF THE INVENTION

Accordingly, embodiments of the present invention provide a system and method to manage shared resources (e.g., inode numbers) of a cluster of servers (e.g., metadata server) without necessitating synchronization of among the server upon each allocation or deallocation (e.g., file creation and deletion) of shared resources.

In one embodiment, the present invention is implemented as a method for managing resources. The method includes receiving a request (e.g., a file creation or delete request), within an electronic system, which corresponds to an object of a file system and accessing a local data structure (e.g., a bitmap wherein each bit of the bitmap indicates whether an inode number is operable to be allocated). The data structure comprises information corresponding to a plurality of inode numbers. The method further includes performing the request and updating the local data structure based on the request. The updating of the local data structure is independent of a plurality of data structures of a cluster of servers. In one embodiment, the cluster of servers is a cluster of metadata servers operable to provide access to a file system. The method may further include initiating a cluster wide lock of the plurality data structures of the cluster of servers and sending a range request. The range request may comprise a range of inode numbers of the local data structure to be reserved. In addition, the plurality of servers may be operable to free an inode number of a range reserved for a remote server of the plurality of servers.

In one embodiment, the present invention is implemented as a computer readable storage medium having stored thereon, computer executable instructions that, if executed by a computer system cause the computer system to perform a method including receiving a request (e.g., a file creation or delete request), within an electronic system, which corresponds to an object of a file system and accessing a local data structure (e.g., a bitmap wherein each bit of the bitmap indicates whether an inode number is operable to be allocated). The data structure comprises information corresponding to a plurality of inode numbers. The method further includes performing the request and updating the local data structure based on the request. The updating of the local data structure is independent of a plurality of data structures of a cluster of servers. In one embodiment, the cluster of servers is a cluster of metadata servers operable to provide access to a file system. The method may further include initiating a cluster wide lock on the plurality data structures of the cluster of servers and sending a range request. The range request may comprise a range of inode numbers of the local data structure to be reserved. In addition, the plurality of servers may be operable to free an inode number of a range reserved for a remote server of the plurality of servers.

In yet another embodiment, the present invention is implemented as a storage cluster system comprising a computer system having one or more processors coupled to a computer readable storage media and executing computer readable code which causes the computer system to implement a process including receiving a request (e.g., a file creation or delete request), within an electronic system, which corresponds to an object of a file system and accessing a local data structure (e.g., a bitmap wherein each bit of the bitmap indicates whether an inode number is operable to be allocated). The data structure comprises information corresponding to a plurality of inode numbers. The method further includes performing the request and updating the local data structure based on the request. The updating of the local data structure is independent of a plurality of data structures of a cluster of servers. In one embodiment, the cluster of servers is a cluster of metadata servers operable to provide access to a file system. The method may further include initiating a cluster wide lock of the plurality data structures of the cluster of servers and sending a range request. The range request may comprise a range of inode numbers of the local data structure to be reserved. In addition, the plurality of servers may be operable to free an inode number of a range reserved for a remote server of the plurality of servers.

BRIEF DESCRIPTION OF THE DRAWINGS

Embodiments of the present invention are illustrated by way of example, and not by way of limitation, in the figures of the accompanying drawings and in which like reference numerals refer to similar elements.

DETAILED DESCRIPTION OF THE INVENTION

Figure 1:
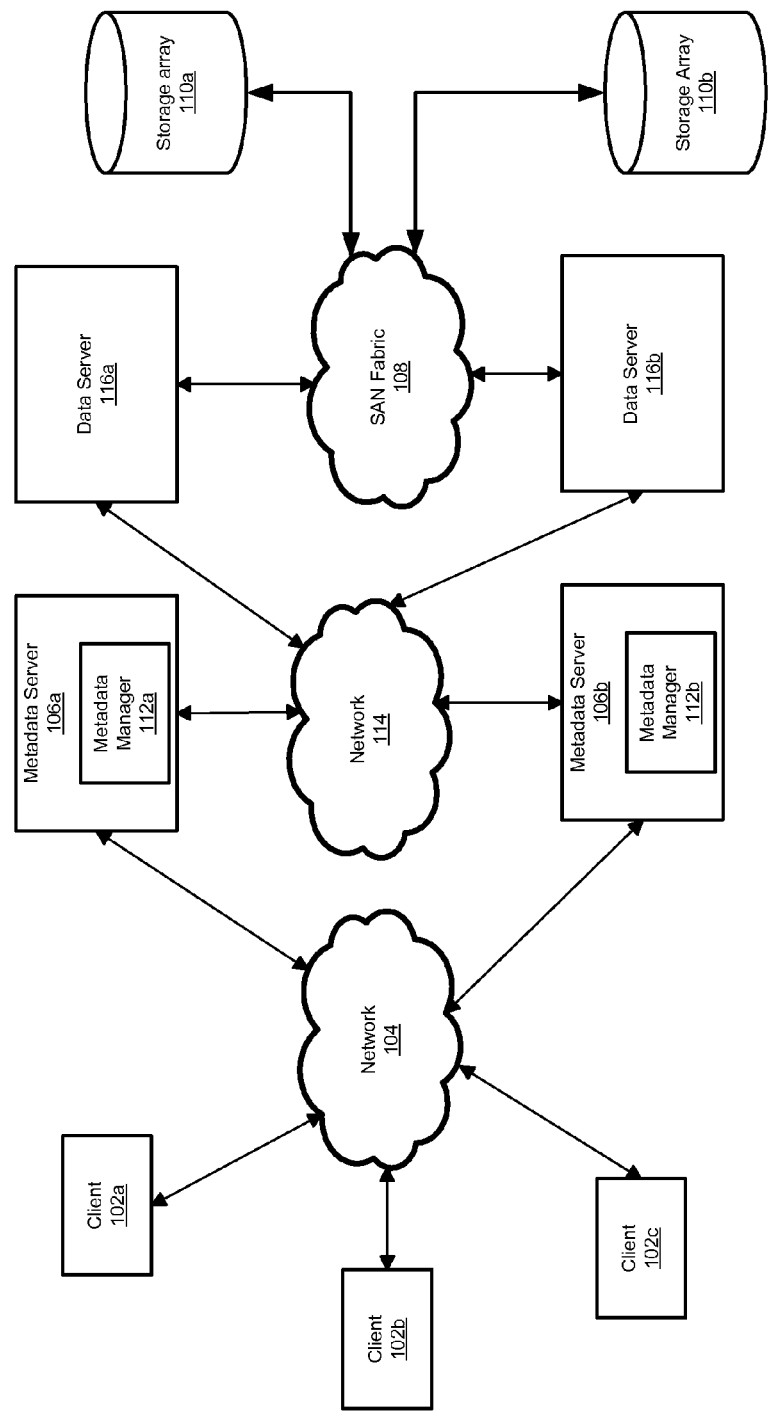
FIG. 1 shows a block diagram of an exemplary operating environment, in accordance with one embodiment of the present invention.

Reference will now be made in detail to various embodiments in accordance with the invention, examples of which are illustrated in the accompanying drawings. While the invention will be described in conjunction with various embodiments, it will be understood that these various embodiments are not intended to limit the invention. On the contrary, the invention is intended to cover alternatives, modifications, and equivalents, which may be included within the scope of the invention as construed according to the appended Claims. Furthermore, in the following detailed description of various embodiments in accordance with the invention, numerous specific details are set forth in order to provide a thorough understanding of the invention. However, it will be evident to one of ordinary skill in the art that the invention may be practiced without these specific details. In other instances, well known methods, procedures, components, and circuits have not been described in detail as not to unnecessarily obscure aspects of the invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of operations or steps or instructions leading to a desired result. The operations or steps are those utilizing physical manipulations of physical quantities. Usually, although not necessarily, these quantities take the form of electrical or magnetic signals capable of being stored, transferred, combined, compared, and otherwise manipulated in a computer system or computing device. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "deactivating," "disabling," "freezing," "re-activating," "enabling," "thawing," "sending," "determining," "flushing," "responding," "generating," "making," "blocking," "accessing," "taking a snapshot," "associating," "allowing," "updating," or the like, refer to actions and processes of a computer system or similar electronic computing device or processor. The computer system or similar electronic computing device manipulates and transforms data represented as physical (electronic) quantities within the computer system memories, registers or other such information storage, transmission or display devices.

It is appreciated that present systems and methods can be implemented in a variety of architectures and configurations. For example, present systems and methods can be implemented as part of a distributed computing environment, a cloud computing environment, a client server environment, etc. Embodiments described herein may be discussed in the general context of computer-executable instructions residing on some form of computer-readable storage medium, such as program modules, executed by one or more computers, computing devices, or other devices. By way of example, and not limitation, computer-readable storage media may comprise computer storage media and communication media. Generally, program modules include routines, programs, objects, components, data structures, etc., that perform particular tasks or implement particular abstract data types. The functionality of the program modules may be combined or distributed as desired in various embodiments.

Computer storage media can include volatile and nonvolatile, removable and non-removable media implemented in any method or technology for storage of information such as computer-readable instructions, data structures, program modules, or other data. Computer storage media can include, but is not limited to, random access memory (RAM), read only memory (ROM), electrically erasable programmable ROM (EEPROM), flash memory, or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can be accessed to retrieve that information.

Communication media can embody computer-executable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared and other wireless media. Combinations of any of the above can also be included within the scope of computer-readable storage media.

FIG. 1 shows a block diagram of an exemplary operating environment, in accordance with one embodiment of the present invention. Exemplary operating environment 100 includes clients 102a-c, networks 104 and 114, metadata servers 106a-b, data servers 116a-b, storage area network (SAN) fabric 108, and storage arrays 110a-b. It is appreciated that that components of exemplary operating environment 100 are exemplary and more or fewer components may be present in various configurations. It is appreciated that operating environment may be part of a distributed computing environment, a cloud computing environment, a client server environment, etc.

Client systems 102a-c access information on storage arrays 110a-b via metadata servers 106a-b using, for example, a web browser or other suitable client communication software (not shown). Metadata servers 106a-b perform requests (e.g., read, create, and delete requests) via data servers 116a-b which are received from clients 102a-c. FIG. 1 depicts the use of a network 104 such as the Internet for exchanging data, but the present disclosure is not limited to the Internet or any particular network-based environment.

Each of metadata servers 106a-b can have multiple clients (e.g., clients 102a-c) connected thereto. Data servers 116a-b can provide access to data for types of applications including, but not limited to, database servers, network file system (NFS) servers, and application servers (e.g., billing). For example, applications and servers might have thousands of people accessing them from different locations, thus the applications and servers need to be highly available and the cluster fault tolerant. In some embodiments, data servers 116a-b have access to shared storage of storage arrays 110a-b with each of data servers 106a-b having a built-in lock manager thereby allowing data servers 106a-b to access the shared storage. Data servers 116a-b and metadata servers 106a-b provide access to a file system. Each of data servers 116a-b may communicate with each other over a network (e.g., a redundant private network) (not shown). Data servers 116a-b may be linked to storage arrays 110a-b in a variety of ways including, fibre channel.

Metadata servers 106a-b respectively execute metadata managers 112a-b which manage the metadata of objects which represent data (e.g., files) on storage arrays 110a-b. In one embodiment, metadata managers 112a-b track allocation and deallocation of inode numbers as files or other object related data objects are created and deleted. In one embodiment, inodes are file system structures which maintain mappings of a file or object and inode numbers are identifiers used to identify and access inodes. It is appreciated that embodiments of the present invention are operable to handle allocation of resources corresponding to any type of object In one embodiment, metadata servers 106a-b may provide access to one or more file systems which are accessed via data servers 116a-b. The file system may be spread across data servers 116a-b and thus there can be a plurality of file systems across data servers 116a-b. In one embodiment, a cluster of metadata servers cooperate to host the metadata (e.g., name space and transactions) for a single file system and the metadata servers 106a-b further maintain a single inode number space for the file system. Embodiments of the present invention manage the common inode number space across a cluster of metadata servers.

In particular, when serving the same file system from multiple metadata servers, the metadata servers coordinate the use of common resources. In one exemplary embodiment, metadata servers 106a-b each maintain bitmaps to track inode number allocation. To manage the allocation or removal of the inode number, each bit of the bitmaps indicate whether an inode number is free for allocation or not. When an object or file is created or removed, the local metadata server bitmap is modified to reflect the current state of the inode numbers.

Metadata servers 106a-b use inode numbers to access the metadata associated with an object and thereby carry out a request (e.g., read or write request). Accordingly, inodes are updated quite often in the file system. Inode numbers are allocated to the files when the files are created. When the file system goes to create a file, the file system determines a free or available inode number and allocates a free inode number to the file. When the file is removed, the inode number is marked as free and can be allocated to other files.

When a client issues a read request, the metadata server that receives the request performs a look up based on the inode number to access the metadata of the file and then perform the read of the file. Inode numbers may further be used in performing any updates on the metadata. For example, the metadata may include information on the last access time of a file or permissions of a file.

Inode numbers are also used in performing a write requests. In one embodiment, with a block based file system, the inode number will be used to access a block map that represents the blocks of the file. If there is to be data written at an offset of 10k, the block map is used to determine which blocks are allocated and which blocks are not allocated. In one exemplary embodiment, when a metadata server receives a write request, the metadata server will query the block map and determine where the write operation is to be performed. For example, if there is a request to extend a file and add some blocks or objects to the file, the metadata corresponding to the file is modified.

Figure 2:
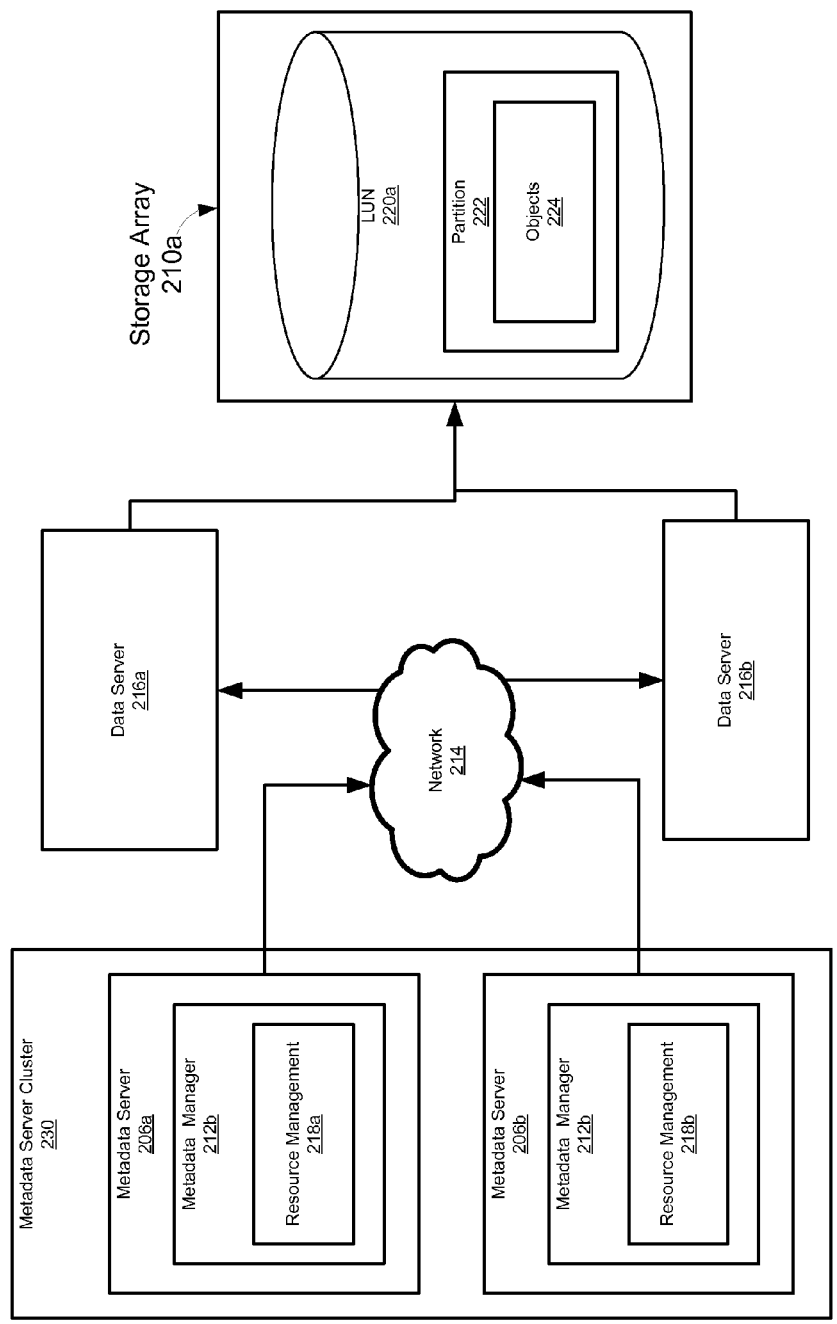
FIG. 2 shows a block diagram of exemplary metadata servers and exemplary data servers, in accordance with one embodiment of the present invention.

FIG. 2 shows a block diagram of exemplary metadata servers and exemplary data servers, in accordance with one embodiment of the present invention. Diagram 200 includes metadata servers 206a-b, network 214, data servers 216a-b, and storage array 210a. In one embodiment, metadata servers 206a-b are part of metadata server cluster 230.

Storage array 210a includes logical unit number (LUN) 220a. LUN 220a includes partition 222 which includes objects 224. LUN 220a may be a single LUN of a plurality of LUNs that are used by data servers 216a-b and metadata servers 206a-b to provide a file system for access by clients (e.g., clients 102a-c). In one embodiment, partition identifiers are used to recognize the partitions. A plurality of partitions can be created within a LUN. In one exemplary embodiment, an object is defined by a partition identifier and an object or node identifier. The file system has a file system identifier which is used to generate a partition identifier. The partition identifier is reserved for a file system on each data server or each LUN. The file system is created by creating objects 224 on data servers 216a-b. In one embodiment, the partitions are assigned to a file system.

Metadata servers 206a-b execute metadata managers 212a-b, respectively. Metadata managers 212a-b include resource management modules 218a-b. Resource management modules 218a-b track inode numbers that are allocated to objects 224 of storage array 210a. For example, an object of objects 224 may represent a file which is identifiable based on a specific inode number that is allocated by resource management module 218a.

In one embodiment, a local data structure (e.g., bitmap) is maintained on each metadata server. Each bit of a bitmap may be associated with a specific inode number. The local bitmaps reflect the inode numbers of a metadata server and are updated by the metadata server performing an operation.

In one exemplary embodiment, each bit the local bitmap corresponds to the inode number whose number matches the bit's position in the bitmap. The bit indicates the local status of the inode number as:

Bit=1: The inode number is available (e.g. free) to be allocated by the metadata server.

Bit=0: The metadata server does not have information about the status of the inode number (e.g., allocated inode number, reserved for another metadata server).

During a range of inode number reservation, a bit of the bitmap will be set to '1' on a metadata server can allocate the inode number and the corresponding bit will be set to '0' for the other bitmaps of the other metadata servers. In one exemplary embodiment, the inode number space (e.g., address space) is 64 bit.

In one embodiment, when a metadata server receives a request for an inode number without status information (e.g., bit='0'), the metadata server can perform read and write actions on the corresponding object. If the metadata server receives a request to delete the file, the metadata server can determine if the inode number is allocated by examining the contents of the object corresponding to the inode number.

In one embodiment, the clients communicate with a single metadata server at a time of the metadata cluster based on a load balancing policy implemented across the cluster of metadata servers. Depending on the load balancing policy, the clients may access a specific metadata server when sending a request to delete a specific file or another specific metadata server for a request to allocate a file.

If there is a skewed allocation (e.g., improper load balancing or unusual load on a particular metadata server), one metadata server may keep reserving portions of the bitmap while a significant amount of deallocations happen on another metadata server, embodiments are operable to run a synchronization to transfer the free inode numbers to balance out the free inode numbers and allocations of inode numbers between the metadata servers.

Figure 3:
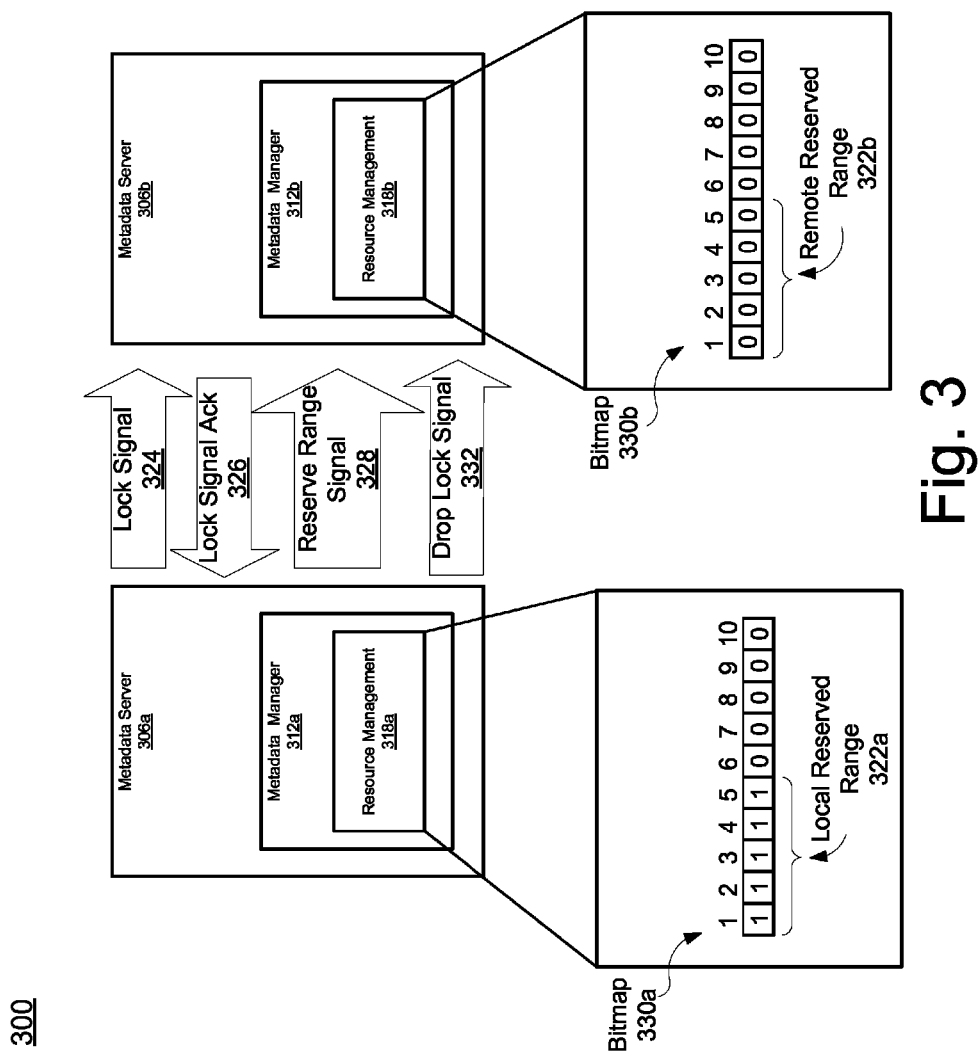
FIG. 3 shows a block diagram of exemplary metadata servers during allocation of a range of inode numbers, in accordance with one embodiment of the present invention.

FIG. 3 shows a block diagram of exemplary metadata servers during allocation of a range inode numbers, in accordance with one embodiment of the present invention. Diagram 300 includes metadata servers 306a-b which execute metadata managers 312a-b. Metadata managers 312a-b include resource management modules 318a-b.

In one embodiment, resource management modules 318a-b manage inode numbers using bitmaps 330a-b, respectively. It is appreciated that embodiments of the present invention may utilize a variety of types of the data structures for tracking allocation of inode numbers. Exemplary bitmaps 330a-b are used to represent whether an inode number is available for allocation or not.

When a metadata server joins a cluster or boots up (e.g., after reboot or start up), the metadata server starts with a local bitmap with each bit set to '0' indicating no inode numbers are available for allocation. The metadata server may signal other metadata servers in the cluster to reserve a range of inode numbers for allocation by the metadata server. Metadata server 306a may send lock signal 324 to metadata server 306b which is part of the same metadata server cluster as metadata server 306a. Metadata server 306b then sends lock signal acknowledgement 326 acknowledging that the lock has been successful. Metadata server 306a may then send reserve range signal 328 to metadata server 306b. Reserve range signal 328 includes a range of inode numbers (e.g., local reserved range 322a corresponding to inode numbers 1-5) to be reserved for allocation by metadata server 306a. Metadata server 306a then sets the bits of bitmap 330a corresponding to the local reserved range 322a to '1.' Upon receiving the reserved range included in reserve range signal 328, metadata server 306b set bits of bitmap 330b corresponding to remote reserved range 322b to '0.' Metadata server 306a may then send drop lock signal 332 to unlock the cluster of metadata servers. Resource management module 318b may further store information such that inode numbers represented by remote reserved range 322b are reserved for another metadata server (e.g., metadata server 306a).

If a metadata server receives a request necessitating an inode number allocation (e.g., a file creation request) and there are no inode numbers marked as available for allocation (e.g., bit='1'), the metadata server invokes a cluster wide lock (e.g., lock signal 324) and sends a range request (e.g., range reserve signal 328) to each metadata server of the cluster of metadata servers. The request includes a range of inode numbers which the other metadata servers of the cluster of metadata servers mark as '0' in their local bitmaps. The requesting metadata server marks the bits for this range as '1' indicating that the metadata server can allocate the objects identifiers in that range. Other metadata servers in a cluster will then initiate cluster wide locks to reserve inode numbers for their respective local bitmaps in a substantially similar manner. The reserving of inode numbers and initial settings of each bit to '0' ensure that a single metadata server will allocate a single inode number.

By reserving ranges of inode numbers, the metadata servers can then allocate inode numbers and track the inode numbers locally (e.g., update a bitmap to indicate the inode numbers have been allocated) without having to communicate with other metadata servers of the cluster. Embodiments of the present invention thus further allow allocation and deallocation of inode numbers without requiring synchronization with the rest of the metadata servers of the cluster upon each allocation or deallocation.

Figure 4:
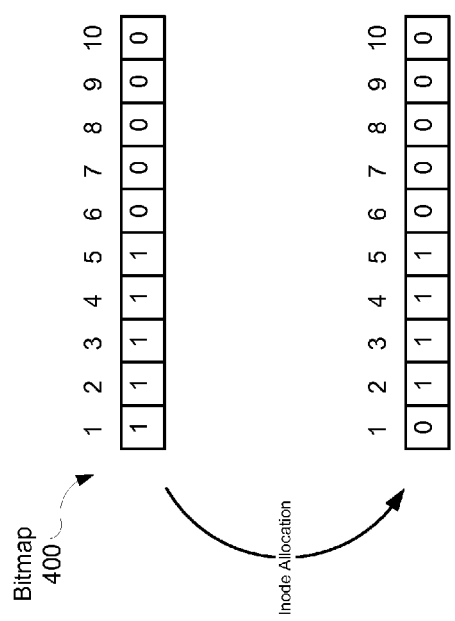
FIG. 4 shows a block diagram of an exemplary metadata server bitmap during allocation of an inode number, in accordance with an embodiment of the present invention.

FIG. 4 shows a block diagram of an exemplary metadata server bitmap during allocation of an inode number, in accordance with an embodiment of the present invention. Bitmap 400 represents a local bitmap operable to be used for tracking inode number allocation, as described herein. When a request is received to create a file (e.g., from clients 102a-c), the metadata server determines or selects an available inode number available for allocation. For example, bit 1 of bitmap 400 indicates that the inode number corresponding to bit 1 is available for allocation and thus bit 1 of bitmap 400 is changed to '0' representing that the inode number has been allocated. Advantageously, embodiments of the present invention are able to allocate inode numbers without needing to signal or synchronize with other metadata servers allocating inode numbers in the same inode number space (e.g., for the same file system).

Figure 5A:
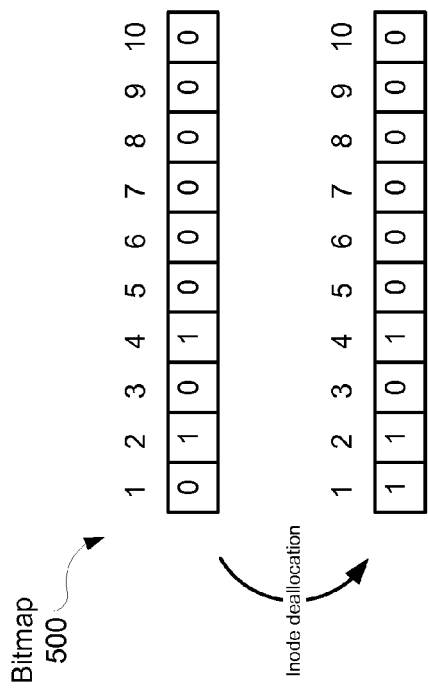
FIG. 5A-B show block diagrams of exemplary metadata server bitmaps during deallocation of an inode number, in accordance with an embodiment of the present invention.
Figure 5B:
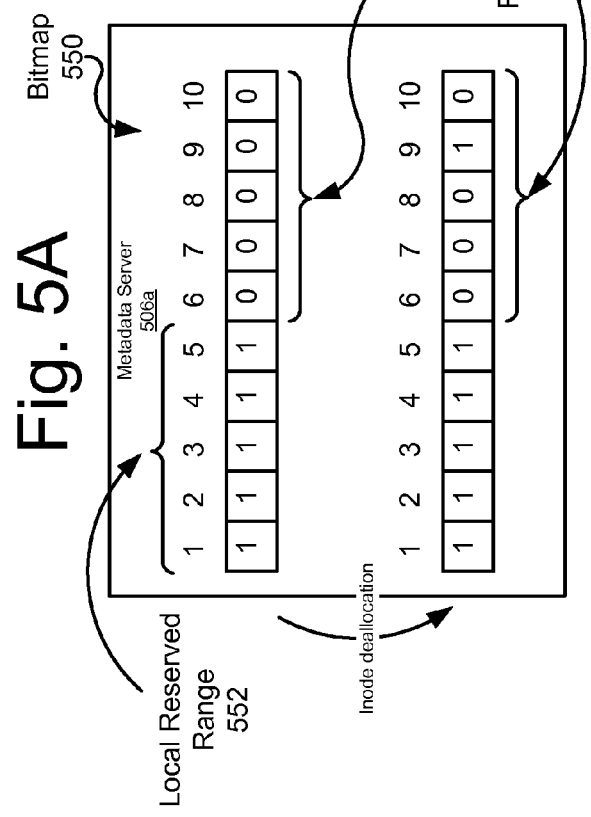

FIG. 5A-B show block diagrams of exemplary metadata server bitmaps during deallocation of an inode number, in accordance with an embodiment of the present invention. Embodiments of the present invention allow a metadata server to deallocate inode numbers without necessitating communication with other metadata servers in a cluster.

FIG. 5A shows a block diagram of an exemplary metadata server bitmap during deallocation, in accordance with an embodiment of the present invention. When a deallocation (e.g., deletion) request is received by a metadata server (e.g., metadata server 106a), the bit of the bitmap corresponding to the inode number is set to '1' after the deletion thereby indicating that the inode number is available for allocation. In one exemplary embodiment, bit 1 of bitmap 500 is changed from '0' to '1' when a request to deallocate the object corresponding to inode number corresponding to bit 1.

In one embodiment, prior to the performance of the deallocation request, a metadata server can use the inode number to examine the contents of the object corresponding to the inode. The examination or checking of the contents of an object provides additional validation of whether or not an inode number has been allocated. For example, prior to performing a delete request for the object corresponding to inode number represented by bit 1 of bitmap 500, metadata server (e.g., metadata server 106a) may check the contents of the object to check whether or not the inode number has been allocated.

FIG. 5B shows a block diagram of an exemplary metadata server bitmaps during deallocation of an inode number reserved for a metadata server in a metadata server cluster, in accordance with an embodiment of the present invention. Bitmap 550 resides on first metadata server 506a and bitmap 560 resides on a second metadata server 506b. In one embodiment, metadata servers 506a-b are part of a metadata server cluster (e.g., providing access to a file system). Bits 1-5 of bitmap 550 correspond to the local reserved range 552 which are reserved for allocation of inode numbers by metadata server 506a. Bits 6-10 correspond to remote reserved range 554 of metadata sever 506a which corresponds to local reserved range 564 of metadata server 506b which is reserved for allocation by metadata server 506b. Each bit of local reserved range 564 is set to '0' indicating that each reserved inode number has been allocated.

In one embodiment, metadata server 506a with bitmap 550 may deallocate an object corresponding to an inode number of remote reserved range 554 without communicating with metadata server 506b. Upon the deallocation of the object corresponding to bit 9, the inode number corresponding to bit 9 set to '1' indicating that the inode number may then be allocated by metadata server 506a. As described herein, the contents of the object may be checked prior to deallocating the inode number.

Embodiments of the present invention thus allow a request for inode number (and corresponding object) deallocation to be preformed without having to communicate with a metadata server that previously had the inode number reserved and allocated the inode number (and corresponding object).

Figure 6:
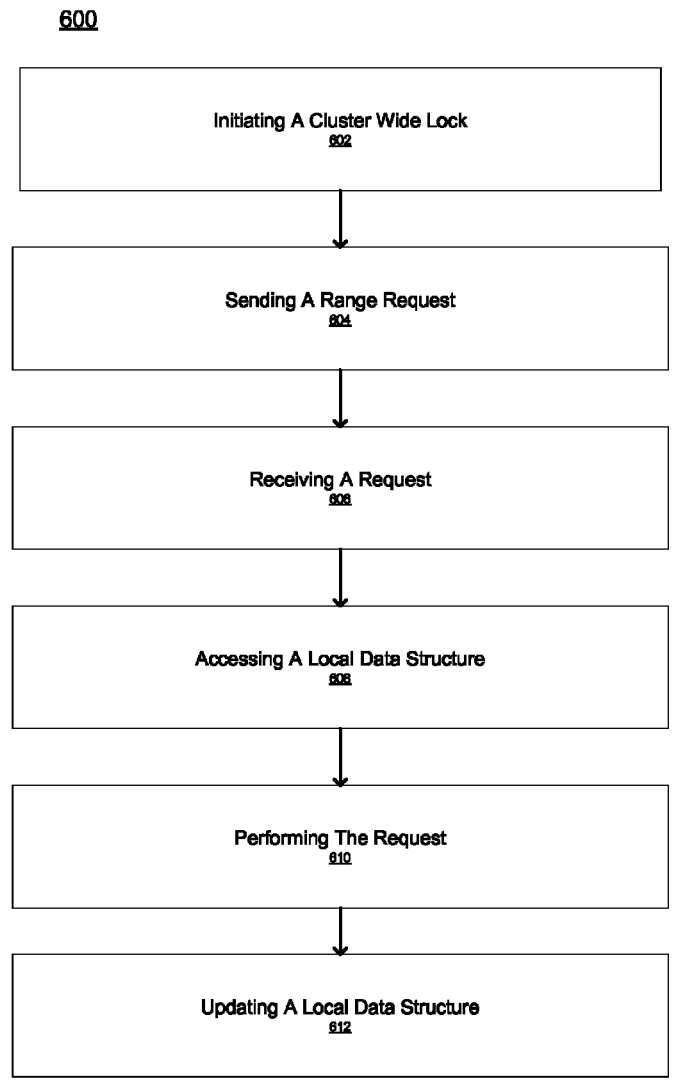
FIG. 6 shows an exemplary flowchart of processes for managing inode numbers, in accordance with embodiments of the present invention.

With reference to FIG. 6, exemplary flowchart 600 illustrates example processes used by various embodiments of the present invention. Although specific blocks are disclosed in flowchart 600, such blocks are exemplary. That is, embodiments are well suited to performing various other blocks or variations of the blocks recited in flowchart 600. It is appreciated that the blocks in flowchart 600 may be performed in an order different than presented, and that not all of the blocks in flowchart 600 may be performed. Flowchart 600 includes processes that, in various embodiments, are carried out by a processor under the control of computer-readable and computer-executable instructions. Embodiments of the present invention may thus be stored as computer readable media or computer-executable instructions including, but not limited to, a firmware update, software update package, or hardware (e.g., ROM).

FIG. 6 shows an exemplary flowchart of processes for managing inode numbers, in accordance with embodiments of the present invention. Process 600 may be performed by each metadata server of a cluster of metadata servers.

At block 602, a cluster wide lock of a plurality data structures of a cluster of servers is initiated. At block 604, a range request is sent. As described herein, the range request comprises a range of inode numbers of a local data structure to be reserved.

At block 606, a request is received within an electronic system. As described herein, the request corresponds to an object of a file system (e.g., a request to create a file, delete a file, access a file, etc.).

At block 608, a local data structure is accessed. As described herein, the data structure comprises information corresponding to a plurality of inode numbers. In one embodiment, the local data structure is a bitmap and each bit of the bitmap indicates whether an inode number is operable to be allocated.

At block 610, the request is performed. In one embodiment, the contents of an object corresponding to an inode number is determined prior to performing the request.

At block 612, the local data structure is updated based on the request. As described herein, the updating of the local data structure is independent of a plurality of data structures of other servers of a cluster. In one embodiment, the plurality of servers are metadata servers operable to provide access to a file system. Each of the plurality of servers is operable to free an inode number of a range reserved for a remote server of the plurality of servers.

Figure 7:
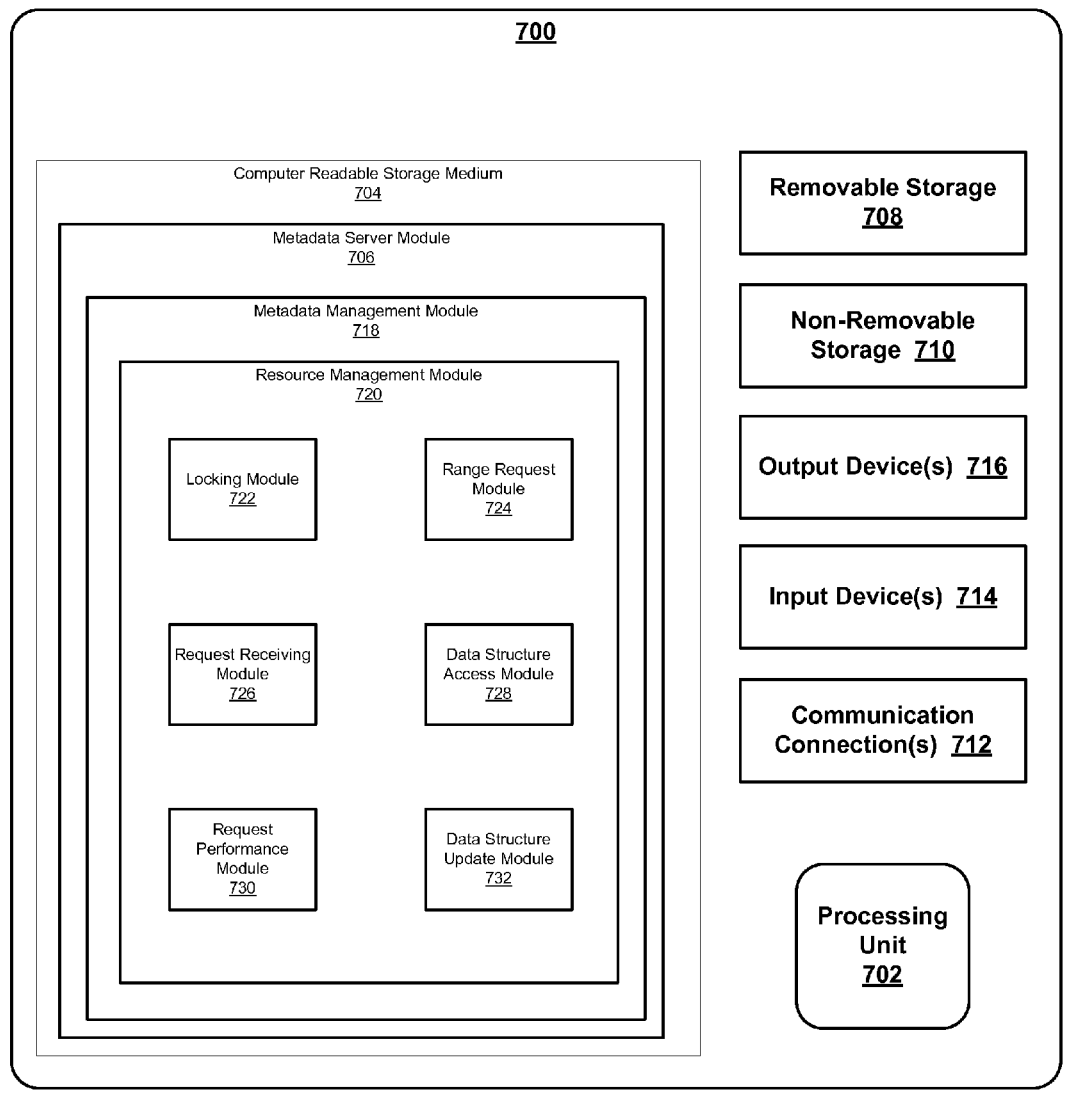
FIG. 7 shows a block diagram of exemplary computer system and corresponding modules, in accordance with one embodiment of the present invention.

FIG. 7 illustrates example components used by various embodiments of the present invention. Although specific components are disclosed in system 700, it should be appreciated that such components are examples. That is, embodiments of the present invention are well suited to having various other components or variations of the components recited in system 700. It is appreciated that the components in system 700 may operate with other components than those presented, and that not all of the components of system 700 may be required to achieve the goals of system 700.

FIG. 7 shows a block diagram of an exemplary computer system module 700, in accordance with one embodiment of the present invention. With reference to FIG. 7, an exemplary system module for implementing embodiments includes a general purpose computing system environment, such as computing system environment 700. Computing system environment 700 may include, but is not limited to, servers (e.g., servers 106a-b), desktop computers, laptops, tablet PCs, mobile devices, and smartphones. In its most basic configuration, computing system environment 700 typically includes at least one processing unit 702 and computer readable storage medium 704. Depending on the exact configuration and type of computing system environment, computer readable storage medium 704 may be volatile (such as RAM), non-volatile (such as ROM, flash memory, etc.) or some combination of the two. Portions of computer readable storage medium 704 when executed facilitate management of inode numbers (e.g., process 600).

Additionally, computing system environment 700 may also have additional features/functionality. For example, computing system environment 700 may also include additional storage (removable and/or non-removable) including, but not limited to, magnetic or optical disks or tape. Such additional storage is illustrated in FIG. 10 by removable storage 708 and non-removable storage 710. Computer storage media includes volatile and nonvolatile, removable and non-removable media implemented in any method or technology for storage of information such as computer readable instructions, data structures, program modules or other data. Computer readable medium 704, removable storage 708 and non-removable storage 710 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing system environment 700. Any such computer storage media may be part of computing system environment 700.

Computing system environment 700 may also contain communications connection(s) 712 that allow it to communicate with other devices. Communications connection(s) 712 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Communications connection(s) 712 may allow computing system environment 700 to communication over various networks types including, but not limited to, fibre channel, small computer system interface (SCSI), Bluetooth, Ethernet, Wi-fi, Infrared Data Association (IrDA), Local area networks (LAN), Wireless Local area networks (WLAN), wide area networks (WAN) such as the internet, serial, and universal serial bus (USB). It is appreciated the various network types that communication connection(s) 712 connect to may run a plurality of network protocols including, but not limited to, transmission control protocol (TCP), internet protocol (IP), real-time transport protocol (RTP), real-time transport control protocol (RTCP), file transfer protocol (FTP), and hypertext transfer protocol (HTTP).

Computing system environment 700 may also have input device(s) 714 such as a keyboard, mouse, pen, voice input device, touch input device, remote control, etc. Output device(s) 716 such as a display, speakers, etc. may also be included. All these devices are well known in the art and are not discussed at length.

In one embodiment, computer readable storage medium 704 includes metadata server module 706 which includes metadata management module 718. Metadata management module 718 includes resource management module 720.

Resource management module 720 includes locking module 722, range request module 724, request receiving module 726, data structure access module 728, request performance module 730, and data structure update module 732. Locking module 722 is operable to initiate cluster wide locks (e.g., among a plurality of metadata servers) as described herein. Range request module 724 is operable send and coordinate range requests to reserve ranges of inode numbers, as described herein. Request receiving module 726 is operable to receive requests (e.g., file creation and file deletion requests). Data structure access module 728 is operable to access a data structure of representing inode numbers (e.g., a bitmap for tracking inode numbers), as described herein. Request performance module 730 is operable to perform a request (e.g., file creation, read, write, and delete), as described herein. Data structure update module 732 is operable to update a local data structure corresponding to inode numbers (e.g., bitmap), as described herein.

Figure 8:
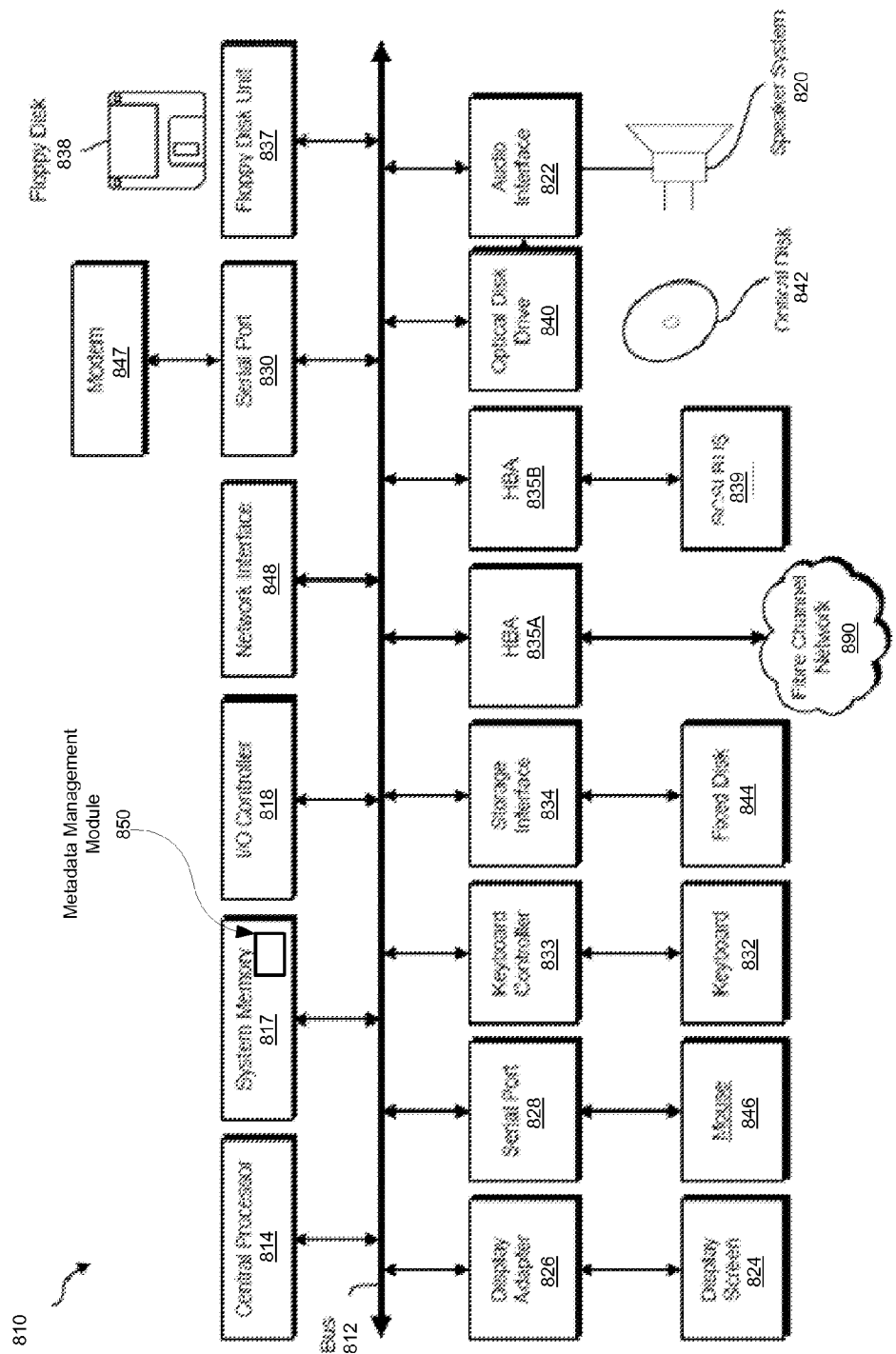
FIG. 8 shows a block diagram of another exemplary computer system, in accordance with one embodiment of the present invention.

FIG. 8 shows a block diagram of another exemplary computer system, in accordance with one embodiment of the present invention. FIG. 8 depicts a block diagram of a computer system 810 suitable for implementing the present disclosure. Computer system 810 includes a bus 812 which interconnects major subsystems of computer system 810, such as a central processor 814, a system memory 817 (typically RAM, but which may also include ROM, flash RAM, or the like), an input/output controller 818, an external audio device, such as a speaker system 820 via an audio output interface 822, an external device, such as a display screen 824 via display adapter 826, serial ports 828 and 830, a keyboard 832 (interfaced with a keyboard controller 833), a storage interface 834, a floppy disk drive 837 operative to receive a floppy disk 838, a host bus adapter (HBA) interface card 835A operative to connect with a Fibre Channel network 890, a host bus adapter (HBA) interface card 835B operative to connect to a SCSI bus 839, and an optical disk drive 840 operative to receive an optical disk 842. Also included are a mouse 846 (or other point-and-click device, coupled to bus 812 via serial port 828), a modem 847 (coupled to bus 812 via serial port 830), and a network interface 848 (coupled directly to bus 812). System memory 817 includes metadata management module 850 which is operable to manage inode numbers for a metadata server.

Bus 812 allows data communication between central processor 814 and system memory 817, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 810 are generally stored on and accessed via a computer readable medium, such as a hard disk drive (e.g., fixed disk 844), an optical drive (e.g., optical drive 840), a floppy disk unit 837, or other storage medium. Additionally, applications can be in the form of electronic signals modulated in accordance with the application and data communication technology when accessed via network modem 847 or interface 848.

Storage interface 834, as with the other storage interfaces of computer system 810, can connect to a standard computer readable medium for storage and/or retrieval of information, such as a fixed disk drive 844. Fixed disk drive 844 may be a part of computer system 810 or may be separate and accessed through other interface systems. Modem 847 may provide a direct connection to a remote server via a telephone link or to the Internet via an internet service provider (ISP). Network interface 848 may provide a direct connection to a remote server via a direct network link to the Internet via a POP (point of presence). Network interface 848 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 8 need not be present to practice the present disclosure. The devices and subsystems can be interconnected in different ways from that shown in FIG. 8. The operation of a computer system such as that shown in FIG. 8 is readily known in the art and is not discussed in detail in this application. Code to implement the present disclosure can be stored in computer-readable storage media such as one or more of system memory 817, fixed disk 844, optical disk 842, or floppy disk 838. The operating system provided on computer system 810 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Thus, embodiments of the present invention provide a system and method to manage shared resources (e.g., inode numbers) of a cluster of servers (e.g., metadata server) without necessitating synchronization of among the server upon each allocation or deallocation (e.g., file creation and deletion, respectively) of shared resources.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for managing resources, the method comprising:
   receiving a request to perform at least one operation on an object of a file system within an electronic system of a cluster of servers;
   accessing a local data structure on a local server of said cluster of servers, wherein said local data structure comprises a bitmap, wherein each bit of said bitmap comprises information corresponding to whether an inode number has been allocated to said object of said file system, and wherein said information tracks inode numbers allocated both on said local server and also on a plurality of remote servers of said cluster of servers;
   performing said request;
   determining whether said inode number has been allocated on said local server;
   determining a bit of said bitmap stored on said local server corresponding to whether said inode number has been allocated on said local server; and
   based at least in part on said request, updating only said bit of said bitmap stored on said local server corresponding to whether said inode number has been allocated on said local server, without updating a corresponding plurality of remote bitmaps stored on said plurality of remote servers corresponding to whether said inode number has been allocated on said plurality of remote servers.

2. The method of claim 1 wherein said request comprises a request to create a file.

3. The method of claim 1 wherein said request comprises a request to delete a file.

4. The method of claim 1 wherein said plurality of servers are metadata servers operable to provide access to a file system.

5. The method of claim 1 further comprising:
   initiating a cluster wide lock of said plurality of remote data structures of said cluster of servers.

6. The method of claim 5 further comprising:
   sending a range request, wherein said range request comprises a range of inode numbers of said local data structure.

7. The method of claim 1 wherein each of said plurality of servers is operable to free an inode number of a range reserved for a remote server of said plurality of servers.

8. The method of claim 1 further comprising:
   determining the contents of an object corresponding to an inode number.

9. A computer readable storage medium having stored thereon, computer executable instructions that, if executed by a computer system cause the computer system to perform a method of providing storage information comprising:
   receiving a request to perform at least one operation on an object of a file system within an electronic system of a cluster of servers;
   accessing a local data structure on a local server of said cluster of servers, wherein said local data structure comprises a bitmap, wherein each bit of said bitmap comprises information corresponding to whether an inode number has been allocated to said object of said file system, and wherein said information tracks inode numbers allocated both on said local server and also on a plurality of remote servers of said cluster of servers;
   performing said request;
   determining whether said inode number has been allocated on said local server;
   determining a bit of said bitmap stored on said local server corresponding to whether said inode number has been allocated on said local server; and
   based at least in part on said request, updating only said bit of said bitmap stored on said local server corresponding to whether said inode number has been allocated on said local server, without updating a corresponding plurality of remote bitmaps stored on said plurality of remote servers corresponding to whether said inode number has been allocated on said plurality of remote servers.

10. The computer readable storage medium of claim 9, wherein said request comprises a request to create a file.

11. The computer readable storage medium of claim 9, wherein said local data structure is operable to indicate whether an inode number is reserved for a remote server.

12. The computer readable storage medium of claim 9, wherein said request comprises a request to delete a file.

13. The computer readable storage medium of claim 9, wherein said plurality of servers are metadata servers operable to provide access to a file system.

14. The computer readable storage medium of claim 9, wherein said method further comprises:
   initiating a cluster wide lock of said plurality remote data structures of said cluster of servers.

15. The computer readable storage medium of claim 9, wherein said method further comprises:
   sending a range request, wherein said range request comprises a range of inode numbers of said local data structure.

16. A storage cluster system, comprising:
   a computer system comprising one or more processors coupled to a non-transitory computer readable storage medium media and configurable to execute computer readable code stored on the computer readable storage medium media which causes the computer system to implement a method comprising:
   receiving a request to perform at least one operation on an object of a file system within an electronic system of a cluster of servers;
   accessing a local data structure on a local server of said cluster of servers, wherein said local data structure comprises a bitmap, wherein each bit of said bitmap comprises information corresponding to whether an inode number has been allocated to said object of said file system, and wherein said information tracks inode numbers allocated both on said local server and also on a plurality of remote servers of said cluster of servers;

performing said request;

determining whether said inode number has been allocated on said local server;

determining a bit of said bitmap stored on said local server corresponding to whether said inode number has been allocated on said local server; and based at least in part on said request, updating only said bit of said bitmap stored on said local server corresponding to whether said inode number has been allocated on said local server, without updating is independent of a corresponding plurality of remote bitmaps_data structures stored on said plurality of remote of a cluster of servers corresponding to whether said inode number has been allocated on said plurality of remote servers.

17. The storage cluster system of claim 16, wherein said method further comprises:

initiating a cluster wide lock of said plurality remote data structures of said cluster of servers.

18. The storage cluster system of claim 16, wherein said method further comprises:

sending a range request, wherein said range request comprises a range of inode numbers of said local data structure.

19. The method of claim 8 wherein said determining of said contents of an object corresponding to said inode number is performed prior to an inode deallocation operation.

20. The method of claim 1, wherein said local data structure is operable to indicate whether an inode number is reserved for a remote server.

21. The storage cluster system of claim 16, wherein said local data structure is operable to indicate whether an inode number is reserved for a remote server.

* * * * *